Figure 1:
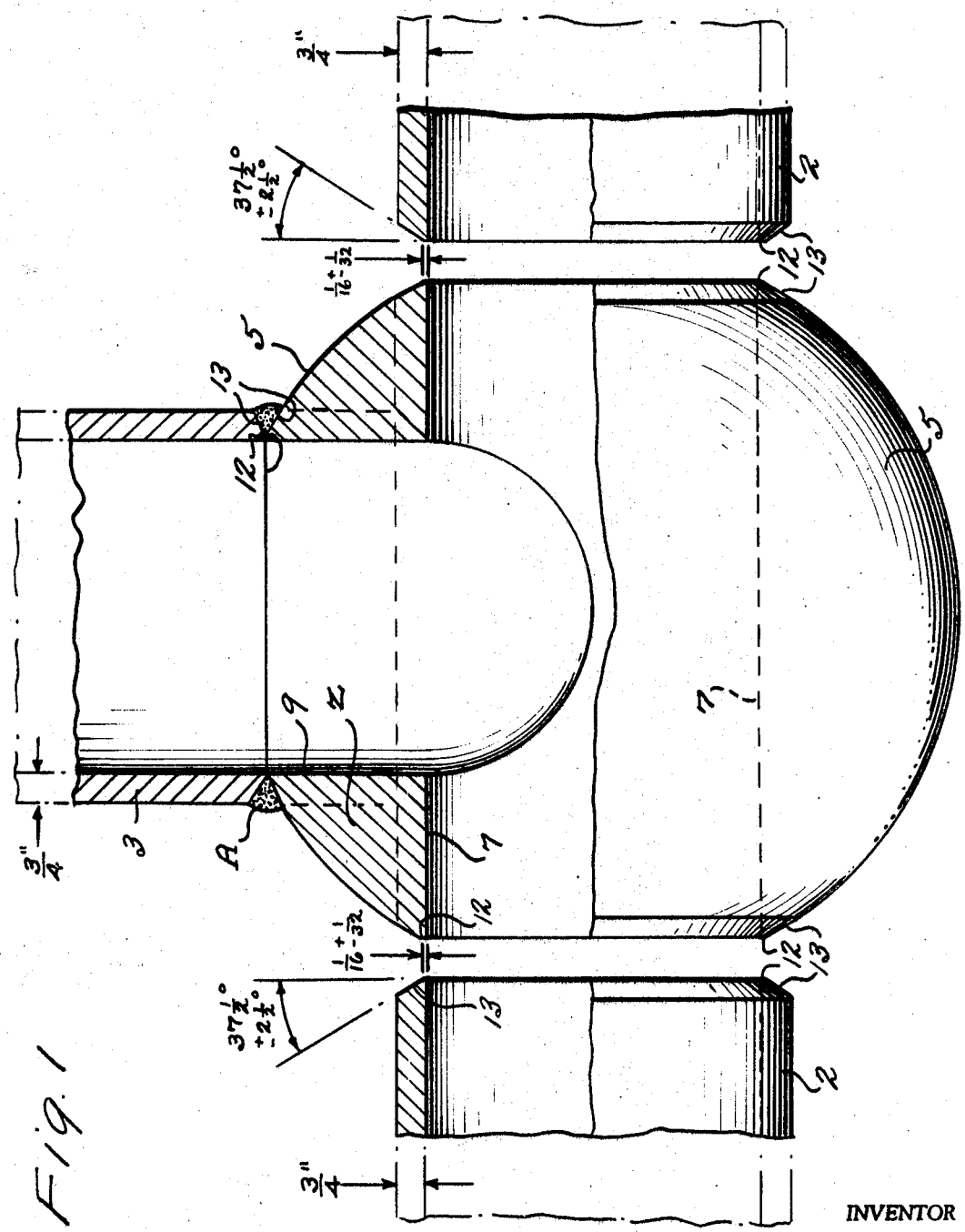

July 16, 1968   C. H. MOORE   3,392,994
CONNECTOR MEANS FOR PRESSURE PIPELINES
Filed June 16, 1966   2 Sheets-Sheet 2

INVENTOR
CHARLES H MOORE

BY Geib + Porter
ATTORNEYS

United States Patent Office 3,392,994
Patented July 16, 1968

3,392,994
CONNECTOR MEANS FOR PRESSURE PIPELINES
Charles H. Moore, West Chester, Pa., assignor to Bonney Forge & Foundry Inc., Southfield, Mich., a corporation of Delaware
Continuation-in-part of application Ser. No. 336,211, Jan. 7, 1964. This application June 16, 1966, Ser. No. 557,980
8 Claims. (Cl. 285—156)

This invention relates to connector means for pipelines which are adapted to carry fluids under high pressures, such, for example, as long distance gas and oil lines; and the present application is a continuation-in-part application of my patent application Ser. No. 336,211, filed Jan. 7, 1964 (now abandoned) and of my pending application Ser. No. 543,443, filed Mar. 11, 1966 (now abandoned).

As in the case of the earlier applications referred to, it is among the objects of the invention of the present application to provide novel structures of the class described which are characterized by improved resistance to high internal pressures, lowered inventory costs, and other advantages as will appear hereinafter.

The difficulties and limitations with respect to pipe line connectors in general are, of course, very well known to those skilled in the art.

It is abundantly clear that any opening made in the main pipe (or run) for a branch connection interrupts the uniformity of hoop stresses in the pipe wall and results in these stresses being concentrated and intensified at the edges defining the opening. These hoop stresses are directly proportional to the pressure and hydraulic diameter of the section and inversely proportional to the wall-thickness of the section.

Reinforcement of this weakness in branch connections is often necessary. This may, of course, be attained by making the walls of the pipe heavier at that point where reinforcement is required or by the use of an external reinforcing member. However, such procedures are costly and inefficient.

The rules for strengthening the joints are established by various codes—such as the A.S.A. code for pressure piping, the A.S.M.E. power boiler code or by such manufacturing codes as the A.S.A. Standard B-16.9.

The invention of both of my aforementioned prior patent applications contemplates an exteriorly spherical one-piece solid metal forging which is bored to provide one or more interiorly disposed passages of circular cross-section, the outer ends of said passages communicating with the exterior surface of said solid metal forging and thereat are of the same diameter as the internal diameter of the adjacent ends of the pipes of the connecting pipeline.

As will be readily understood by those skilled in the art, the provision of such a connector member and connector assembly as described immediately hereinbefore will result in there being required but one outside spherical diameter of connector member for each nominal size of pipe. This will keep the cost of tooling and inventory at a minimum, and greatly reduce expenses which are incident to present day manufacturing methods of producing T's and crosses from seamless pieces of tubing of varying wall thicknesses; and particularly those which are to be welded to, and match up with pipe of the following schedule numbers:

ASA Standard B-36.10 ___ #10, #20, #30, #40, #60, #80, #100, #120, #140, #160, Standard, Extra Strong and Double Extra Strong.
ASA B-36.19 _____ #5S, #10S.
ASTM A-409 _____ #40S, and #80S.

According to the foregoing, the reenforcement provided by the hereinbefore described connector members of my patent application Ser. No. 336,211, filed Jan. 7, 1964 (now abandoned) and my patent application Ser. No. 543,443, filed Mar. 11, 1966, may be illustrated in the following manner:

| Nominal pipe size (in inches) | Outside diameter of sphere (in inches) | Square inches developed to reinforce full size branch (as a tee or cross) | Reinforces upwardly through wall pipe | Wall thickness of pipe (in inches) |
|---|---|---|---|---|
| 4 | 8¾ | 2.25 | Double Extra Strong. | .674 |
| 6 | 12½ | 4.12 | Schedule 160 | .719 |
| 8 | 16⅛ | 6.56 | do | .906 |
| 10 | 20¼ | 10.15 | do | 1.125 |
| 12 | 23⅞ | 14.06 | do | 1.312 |
| 14 | 26¾ | 19.14 | do | 1.406 |
| 16 | 29¾ | 21.39 | do | 1.594 |
| 18 | 33¼ | 26.26 | do | 1.781 |

Any branch outlet which is cut into the exterior surface of the connector members as described will be in one plane.

This is another advantage since it means that branch pipes may be attached by welding to the exterior surface of the connector member without preliminary preparation as would otherwise be the case. That is, in connector structures prior to the inventions of my aforementioned patent applications the branch pipes must be burned to fit the Run pipe and the same difficult "up-hill and down-hill" procedure must take place in attachment welds. This does not occur in the case of the novel connector members referred to because all welds and cut-outs thereon are in the same plan.

Figure 2:
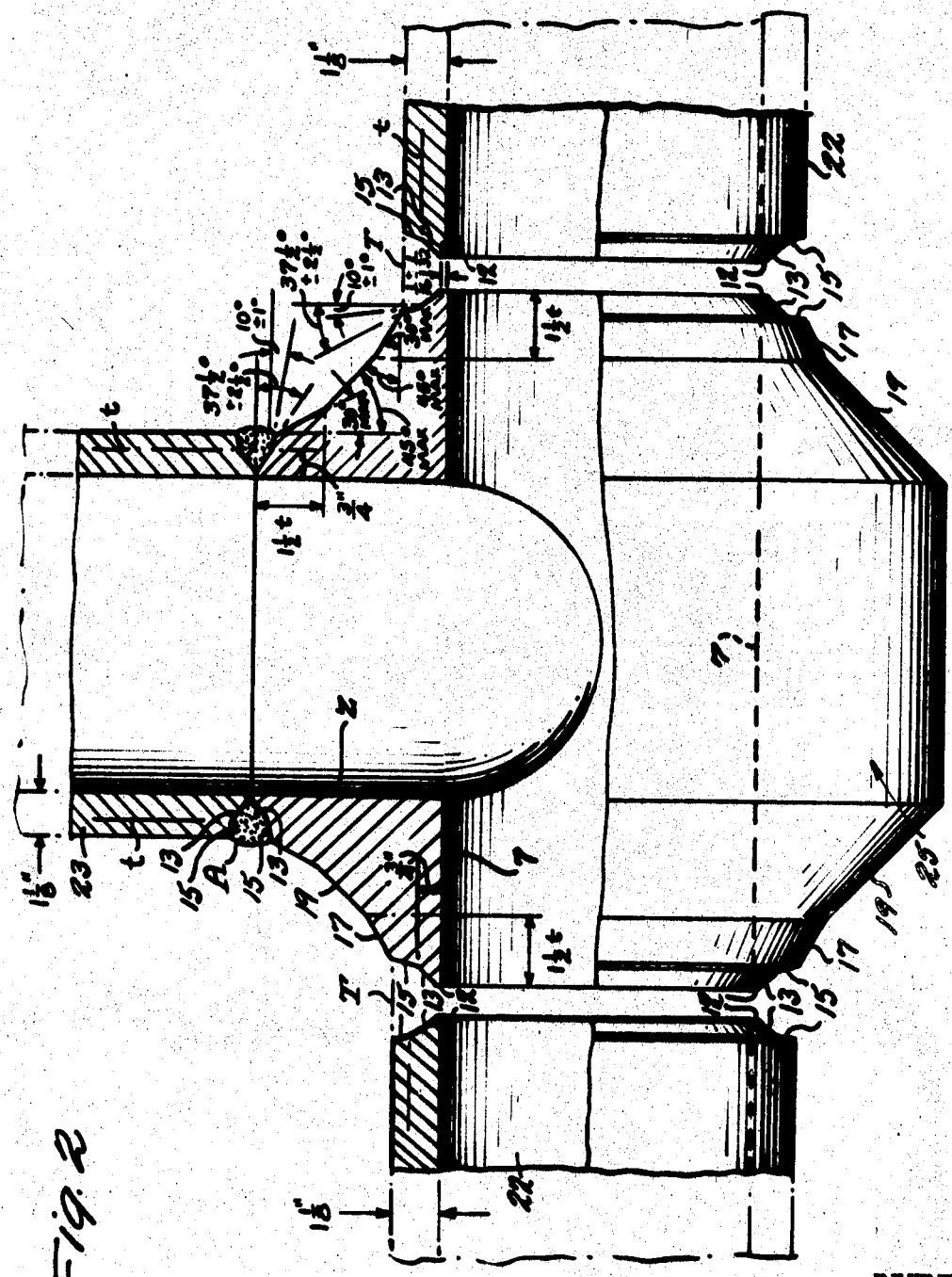

Referring to the accompanying drawings:

FIGURE 1 is a fragmentary elevational view, partly in section, of a T connection disposed in a main pipe line and connecting a branch pipe thereto; the said connection embodying a connector member composed of a one-piece metallic forging which is initially solid but bored to provide interiorly disposed passages of circular cross-section which communicate with the outer spherical surface and thereat are of the same diameter as the internal diameter of the adjacent ends of the pipes of the connecting main and branch lines; said connector member being particularly adapted for use with connecting pipes having a wall-thickness of no greater than ¾-inch; and FIGURE 2 is a view which is generally similar to that of FIGURE 1, but wherein the connector member is for use with connecting pipes having a wall-thickness which is greater than ¾-inch.

In both FIGURE 1 and FIGURE 2 the main and branch pipes are designated by the numeral 2 and 3, respectively. The connector member or T, in the present example, is shown at 5; and, as previously indicated, it is composed of a one-piece metallic forging which is initially solid.

This one-piece solid metal forging 5 is shown as provided with a straight bore 7 extending completely therethrough and a single right-angular bore 9 which communicates therewith.

Except for these bores or interiorly disposed passages of circular cross-section, the one-piece metal forging or connector member 5 is completely solid throughout; and where these interiorly disposed passages or bores communicate with the exterior of the connector member they are of the same diameter as the inside diameter of the pipes with which they connect.

In FIGURE 1 of the drawings there is shown a pair of aligned main or run pipes 2 which are connected to a branch pipe 3 through the medium of a connector member 5 having a line bore 7 and a branch bore 9, said connector member forming a T and being of the novel construction described hereinbefore. As will be observed the wall-thickness of the line pipe 2 and the branch pipe 3 is illustrated as being ¾-inch.

According to established welding codes, (i.e. ASA B–16.25—1959) the end of a pipe of ¾-inch wall-thickness or less must, if it is to be welded to a connector member, or to another pipe of similar size and shape, be provided immediately adjoining its wall with a right-angularly extending flat surface or annular ring 12 having a width of 1/16-inch (with a tolerance of ±1/32-inch). Also that immediately adjoining the periphery of this narrow annular flat surface 12 there be a kerf or bevel 13 which extends from a plane containing the annular ring 12 at an angle of 37½° (with a tolerance of ±2½°). The weld, which is continuous, may be accomplished by any of a number of well-known methods; and is represented at A in the upper portion of FIGURE 1.

The connector member 5 comprises a body of metal which is initially spherical and initially solid, i.e. prior to the formation of the bores 7 and 9.

In the example of FIGURE 1 the spherical exterior of the connector member 5 is almost fully retained, departure therefrom being only to the extent occasioned by the removal of the metal by the simple boring operations referred to and, of course, the equally simple machining operations in providing the right-angularly extending flat surface (or annular ring) 12 and the aforementioned immediately adjoining and peripherally extending kerf or frusto-conically bevelled area 13.

As emphasized in my aforementioned patent application Ser. No. 336,211 (now abandoned) and my patent application Ser. No. 543,443, filed Mar. 11, 1966, the formation of bores or interiorly disposed passages in a metal body which is initially spherical and initially solid provides a connector member of the class described wherein there is reenforcement of the areas immediately adjoining the ports, or points of connection with the pipes of a magnitude far greater than minimum Code requirements and far greater than corresponding reenforcement provided by any of the prior art devices presently known to me.

As stated earlier herein, the connector member and associated connecting pipes of FIGURE 2 of the drawings represent the teachings of the present invention as applied to connecting pipes having wall-thickness of more than ¾-inch. In this illustrative embodiment, the connector member is again in the form of a T and the wall-thickness of both the main or run pipes 22 and the branch pipe 23 is 1⅛ inches.

As in the case of the connector member 5 of FIGURE 1, the connector member of FIGURE 2 (which is represented at 25) is provided with a flat annular area 12 which immediately adjoins the port and which is disposed at right-angles to the axis of the port, the said flat annular area being between approximately 1/32-inch and approximately 3/32-inch in width and, as in the case of FIGURE 1, the connector member 25 of FIG. 2 is also provided with a frusto-conical area which surrounds and is immediately adjacent said flat annular area and which extends therefrom at an angle which is between approximately 35 degrees and approximately 40 degrees, the width of said flat annular area (12) and said frusto-concial area 13 totalling no more than approximately ¾-inch.

Referring to the right-hand portion of FIGURE 2, it will be observed that surrounding, and immediately adjoining, the frusto-conical bevel or kerf 13 there is a bevelled or frusto-conical surface 15 which is of considerably reduced angularity. This second bevelled or frusto-conical surface 15 must, in order to conform to code welding requirements for pipe having wall thickness of more than ¾-inch extend from a plane containing the annular flat surface or ring 12 at an angle of 10° (with a tolerance of ±1°).

This second bevelled or frusto-conical surface 15 of 10° angularity (with a tolerance of ±1°) extends toward the outer wall of the pipe 22 from a point which commences at the outer limit of what would be a ¾-inch wall thickness and terminates at a line T which represents the outer terminus of the actual wall thickness of the pipe 22 which is to be welded to the connector member 25.

Under the requirements of the various codes—such as the ASA Code for pressure piping, the A.S.M.E. power boiler code, the ASA Standard B–16.9—the connector member must provide adequate reenforcement area extending from the outer edge of the port inwardly of the wall defining it for a distance which is 1½ times the wall thickness of the pipe to be connected thereto. This requirement may be met by a third frusto-conical surface or area 17 which surrounds and immediately adjoins the second frusto-conical area of 10° angularity ±1°.

This third frusto-conical area 17 may extend for a distance which commences at the periphery of the second frusto-conical area 15 (10° angularity ±1°) and terminates at a line which represents the terminus of the 1½ times point described immediately hereinbefore. However, this third frusto-conical area 17 must be disposed at an angle which is no greater than approximately 30° with respect to a plane containing the annular flat surface or ring 12.

Surrounding and immediately adjoining the third frusto-conical area 17 (maximum angularity of approximately 30°) there may be a fourth frusto-conical area 19 which extends at an angle which is no greater than approximately 45° with respect to a plane containing the annular flat surface or ring 12.

It will, of course, be understood that so far as concerns the various code requirements the third frusto-conical area 17 (maximum 30° angularity) and the fourth frusto-conical area (maximum 45° angularity) may be eliminated. However, the reenforcement provided by these frusto-conical areas 17 and 19 is a very important feature of the present invention.

All of the hereinbefore described changes on the interior and exterior of the initially spherically and initially solid body of metal are relatively inexpensively accomplished by conventional machining operations.

It is also to be noted that in the area Z of reenforcement, the thin tapering wall at the outer extremity of the port of the connector member gradually increases inwardly thereby providing for greatly increased dissipation of the heat accruing from the welding necessary for the attachment of the pipe to the port. This provides good stress results, and since the exterior surface of the connector member is provided with the various reenforcement areas described this highly desirable condition exists at all points (i.e. 360 degrees) about the attaching pipe.

Because of having but one size connector member as disclosed herein for each nominal pipe size for Schedules 100 and heavier there is a tremendous saving in inventory. Using a 29¾″ connector member of the present invention for nominal size 16″ pipe, one can cut in at 90° from the run openings to accommodate all pipe sizes as T's from 16″ downwardly, namely 16″, 14″, 12″, 10″, 8″, 6″, 5″, 4″, 3½″, 3″, 2½″ and 2″. Also by placing the opening at 180° from these T outlets there is provided this single size connector member that can accommodate the same nominal size pipes or any combination of them.

It will be understood by those skilled in the art that while the teachings of the present invention have been shown and described in connection with connector T's they are equally applicable to various other forms of connector members, such as crosses, Y's, etc. Also a connector member utilizing interiorly disposed passages for the main or run pipes which communicates with the interiorly disposed passages for four branch pipes; in other words a connector member with six outlets or ports on the exterior surface thereof; as shown in FIGURE 6 of my pending patent application Ser. No. 543,443.

The present invention also contemplates a connector member as described earlier, but wherein certain of the interiorly disposed passages while circular in cross-section are of tapered diameter, thereby serving as a reducer.

Having thus described by invention, what I claim as new and desire to secure by Letters Patent is:

I claim:

1. A connector assembly for pressure pipelines comprising a one-piece connector member composed entirely of an initially solid and initially spherical body of metal; said body of metal having at least one interiorly disposed passage of circular cross-section which communicates with openings on the exterior thereof; at least one of the openings on the exterior of said body of metal defining a port which is surrounded by an immediately adjacent flat annular area disposed at right-angles to the axis of the port and which is between approximately $\frac{1}{32}$-inch and approximately $\frac{3}{32}$-inch in width; an immediately adjacent frusto-conical area surrounding said flat annular area and extending therefrom at an angle which is between approximately 35 degrees and approximately 40 degrees; the width of said flat annular area and said frusto-conical area totalling no more than approximately $\frac{3}{4}$-inch; a second frusto-conical area immediately adjacent and surrounding said first frusto-conical area; second frusto-conical area being disposed at an angle of between approximately 9 degrees and approximately 11 degrees with respect to said flat annular area; a metallic pressure pipe having an inside diameter which is the same as the inside diameter of said port; one end of said metallic pressure pipe having a flat annular area and first and second frusto-conical areas which are of the same size, shape and angularity as the corresponding areas of said connector member; and a continuous weld connecting said metallic pressure pipe and said connector member in aligned and abutting relationship.

2. A connector assembly for pressure pipelines comprising a one-piece connector member composed entirely of an initially solid and initially spherical body of metal; said body of metal having at least one interiorly disposed passage of circular cross-section which communicates with openings on the exterior thereaof; at least one of the openings on the exterior of said body of metal defining a port which is surrounded by an immediately adjacent flat annular area disposed at right-angles to the axis of the port and which is between approximately $\frac{1}{32}$-inch and approximately $\frac{3}{32}$-inch in width; an immediately adjacent frusto-conical area surrounding said flat annular area and extending therefrom at an angle which is between approximately 35 degrees and approximately 40 degrees; the width of said flat annular area and said frusto-conical area totalling no more than approximately $\frac{3}{4}$-inch; a second frusto-conical area immediately adjacent and surrounding said first frusto-conical area; said second frutso-conical area being disposed at an angle of between approximately 9 degrees and approximately 11 degrees with respect to said flat annular area; a third frusto-conical area immediately adjacent and surrounding said second frusto-conical area; said third frusto-conical area being disposed at an angle of no more than approximately 30 degrees with respect to said flat annular area; a metallic pressure pipe having an inside diameter which is the same as the inside diameter of said port; one end of said metallic pressure pipe having a flat annular area and first and second frusto-conical areas which are of the same size, shape and angularity as the corresponding areas of said connector members; and a continuous weld connecting said metallic pressure pipe and said connector member in aligned and abutting relationship.

3. A connector assembly for pressure pipelines comprising a one-piece connector member composed entirely of an initially solid and initially spherical body of metal; said body of metal having at least one interiorly disposed passage of circular cross-section which communicates with openings on the exterior thereof; at least one of the openings on the exterior of said body of metal defining a port which is surrounded by an immediately adjacent flat annular area disposed at right-angles to the axis of the port and which is between approximately $\frac{1}{32}$-inch and approximately $\frac{3}{32}$-inch in width; an immediately adjacent frusto-conical area surrounding said flat annular area and extending therefrom at an angle which is between approximately 35 degrees and approximately 40 degrees; the width of said flat annular area and said frusto-conical area totalling no more than approximately $\frac{3}{4}$-inch; a second frusto-conical area immediately adjacent and surrounding said first frusto-conical area; said second frusto-conical area being disposed at an angle of between approximately 9 degrees and approximately 11 degrees with respect to said flat annular area; a third frusto-conical area immediately adjacent and surrounding said second frusto-conical area and a fourth frusto-conical area immediately adjacent and surrounding said third frusto-conical area; said third and fourth frusto-conical areas being respectively disposed at maximum angles of approximately 30 degrees and approximately 45 degrees, with respect to said flat annular area; a metallic pressure pipe having an inside diameter which is the same as the inside diameter of said port; one end of said metallic pressure pipe having a flat annular area and first and second frusto-conical areas which are of the same size, shape and angularity as the corresponding areas of said connector member; and a continuous weld connecting said metallic pressure pipe and said connector member in aligned and abutting relationship.

4. A one-piece connector member for pressure pipelines composed entirely of an initially solid and initially spherical body of metal; said body of metal having at least one interiorly disposed passage of circular cross-section which communicates with openings on the exterior thereof; at least one of the openings on the exterior of said body of metal defining a port which is surrounded by an immediately adjacent flat annular area disposed at right-angles to the axis of the port and which is between approximately $\frac{1}{32}$-inch and approximately $\frac{3}{32}$-inch in width; and immediately adjacent frusto-conical area surrounding said flat annular area and extending therefrom at an angle which is between approximately 35 degrees and approximately 40 degrees; the width of said flat annular area and said frusto-conical area totalling no more than approximately $\frac{3}{4}$-inch; and a second frusto-conical area immediately adjacent and surrounding said first frusto-conical area; said second frusto-conical area being disposed at an angle of between approximately 9 degrees and approximately 11 degrees with respect to said flat annular area.

5. The connector member of claim 4 wherein a third frusto-conical area is immediately adjacent and surrounds said second frusto-conical area; said third frusto-conical area being disposed at an angle of no more than approximately 30 degrees with respect to said flat annular area.

6. The connector member of claim 4 wherein a third frusto-conical area is immediately adjacent and surrounds said second frusto-conical area and wherein a fourth frusto-conical area is immediately adjacent and surrounds said third frusto-conical area; said third and fourth frusto-conical areas being respectively disposed at maximum angles of approximately 30 degrees and approximately 45 degrees with respect to said flat annular area.

7. A connector assembly for pressure pipelines comprising a one-piece connector member composed entirely of an initially solid and initially spherical body of metal; said body of metal having at least one interiorly disposed passage of circular cross-section which communicates with openings on the exterior thereof; at least one of the openings on the exterior of said body of metal defining a port which is surrounded by an immediately adjacent flat annular area disposed at right-angles to the axis of the port and which is between approximately $\frac{1}{32}$-inch and approximately $\frac{3}{32}$-inch in width; an immediately adjacent frusto-conical area surrounding said flat annular area and extending therefrom at an angle which is between approximately 35 degrees and approximately 40 degrees; the width of said flat annular area and said frusto-conical area totalling no more than approximately $\frac{3}{4}$-inch; a metallic pressure pipe having an inside diameter which is the same as the inside diameter of said port; one end of said metallic pressure pipe having a flat annular area and an immediately adjacent frusto-conical area which are of the same size, shape and angularity as the corresponding areas of said connector member; and a continuous weld connecting said metallic pressure pipe and said connector member in aligned and abutting relationship.

8. A one-piece connector member for pressure pipelines composed entirely of an initially solid and initially spherical body of metal; said body of metal having at least one interiorly disposed passage of circular cross-section which communicates with openings on the exterior thereof; at least one of the openings on the exterior of said body of metal defining a port which is surrounded by an immediately adjacent flat annular area disposed at right-angles to the axis of the port and which is between approximately $\frac{1}{32}$-inch and approximately $\frac{3}{32}$-inch in width; and an immediately adjacent frusto-conical area surrounding said flat annular area and extending therefrom at an angle which is between approximately 35 degrees and approximately 40 degrees; the width of said flat annular area and said frusto-conical area totalling no more than approximately $\frac{3}{4}$-inch.

References Cited

UNITED STATES PATENTS

| | | | |
|---|---|---|---|
| 751,273 | 2/1904 | Fahrney | 285—177 X |
| 2,157,274 | 5/1939 | Williams | 285—286 X |
| 3,183,023 | 5/1965 | Morrison | 285—286 X |
| 3,186,431 | 6/1965 | Moore | 285—286 X |
| 3,226,818 | 1/1966 | Abbott | 287—87 X |

FOREIGN PATENTS

| | | |
|---|---|---|
| 522,864 | 10/1953 | Belgium. |
| 477,946 | 11/1951 | Canada. |
| 1,133,605 | 7/1962 | Germany. |

EDWARD C. ALLEN, *Primary Examiner.*

CARL W. TOMLIN, T. F. CALLAGHAN, *Examiners.*